United States Patent

Morishita et al.

[11] Patent Number: 5,952,256
[45] Date of Patent: Sep. 14, 1999

[54] OPTICAL GLASS HAVING A NEGATIVE ANOMALOUS DISPERSION

[75] Inventors: Michiko Morishita; Masahiro Onozawa, both of Sagamihara, Japan

[73] Assignee: Kabushiki Kaisha Ohara, Japan

[21] Appl. No.: 09/041,385

[22] Filed: Mar. 12, 1998

[30] Foreign Application Priority Data

Mar. 25, 1997 [JP] Japan ................................ 9-090157

[51] Int. Cl.$^6$ ..................... C03C 3/064; C03C 3/089; C03C 4/00; C03C 3/097
[52] U.S. Cl. ..................... 501/903; 501/63; 501/65; 501/67; 501/70; 501/77; 501/78; 501/79
[58] Field of Search ................... 501/63, 64, 65, 501/67, 70, 77, 78, 79, 900, 901, 903

[56] References Cited

U.S. PATENT DOCUMENTS

| | | | |
|---|---|---|---|
| 3,870,531 | 3/1975 | Jahn | 501/903 |
| 3,877,953 | 4/1975 | Broemer et al. | 501/903 |
| 4,084,978 | 4/1978 | Sagara | 501/63 |
| 4,200,467 | 4/1980 | Broemer et al. | 501/903 |
| 4,612,295 | 9/1986 | Sagara | 501/903 |
| 5,332,700 | 7/1994 | Yamaguchi et al. | 501/903 |

*Primary Examiner*—Michael Marcheschi
*Attorney, Agent, or Firm*—Hedman, Gibson & Costigan, P.C.

[57] ABSTRACT

An optical glass has a large negative anomalous dispersion value and optical constants of refractive index (nd) within a range of 1.65–1.80 and Abbe number (vd) within a range of 28–42. The optical glass includes, as its essential ingredients, in weight percent, 20–50% $SiO_2$, 6–20% $B_2O_3$ where $SiO_2/B_2O_3 \leq 6$, 0.5–15% $ZrO_2$ and 31–50% $Nb_2O_5$.

2 Claims, 1 Drawing Sheet

OPTICAL GLASS HAVING A NEGATIVE ANOMALOUS DISPERSION

BACKGROUND OF THE INVENTION

This invention relates to an optical glass having a large negative anomalous dispersion value and having optical constants of refractive index (nd) within a range from 1.65 to 1.80 and Abbe number (ν d) within a range from 28 to 42 and moreover having no PbO and $As_2O_3$ ingredients.

In an optical lens system, chromatic aberration can be removed for two color light by combining two types of normal optical glasses having different Abbe numbers, namely optical glasses having no large anomalous dispersion. As regards light of other colors, however, there still exists a residual chromatic aberration which is expressed as secondary spectra. Correction of such secondary spectra, particularly spectra in the region from blue spectrum of visible region to the ultraviolet spectrum, is desired in the design of optical lenses and such secondary spectra can be reduced to a substantial degree by combining an optical lens having a large positive anomalous dispersion with an optical lens having a large negative anomalous dispersion.

As optical glasses having optical constants within the above described ranges and having also a negative anomalous dispersion, known in the art are a $SiO_2$—$B_2O_3$—$Al_2O_3$—PbO glass disclosed in Japanese Patent Publication No. Sho-45-2311 and a $SiO_2$—$B_2O_3$—$Al_2O_3$—PbO—$Sb_3O_3$ glass disclosed in Japanese Patent Application Laid-open No. Sho-48-74516. Since, however, these glasses contain a fairly large amount of PbO, they have a high density and a large weight and therefore have a disadvantage in using them. Moreover, these glasses do not have sufficient chemical durability and are costly for coping with environmental problems they have in manufacturing, processing and disusing them.

As glasses containing no PbO, Japanese Patent Publication No. Sho-51-34407 discloses a glass which contains $SiO_2$, $B_2O_3$ and $GeO_2$ as glass-forming materials and also contains $Li_2O$, ZnO, $ZrO_2$ and $Ta_2O_5$. This glass, however, is economically disadvantageous because, for achieving desired refractive index and negative anomalous dispersion, it introduces a large amount of GeO and $Ta_2O_5$ which are very expensive. Besides, this glass has difficulty in melting and therefore it is hard to obtain a homogeneous glass. Japanese Patent Publication No. Sho-58-46459 discloses a $SiO_2$—$Nb_2O_5$—$R_2O$—RO glass but this publication does not suggest anything about negative anomalous dispersion of the glass.

It is, therefore, an object of the invention to provide an optical glass having negative anomalous dispersion and having optical constants of refractive index (nd) within a range from 1.65 to 1.80 and Abbe number (ν d) within a range from 28 to 42, having excellent chemical durability and homogeneity and containing no PbO or $As_2O_3$ which increases cost for protecting the environment and containing no expensive $GeO_2$ or $Ta_2O_5$ as an essential ingredient.

SUMMARY OF THE INVENTION

As a result of laborious studies and experiments made by the inventors of the present invention, it has been found, which has led to the present invention, that the above described object of the invention can be achieved by providing a $SiO_2$—$B_2O_3$—$ZrO_2$—$Nb_2O_5$ glass of a specific composition.

For achieving the object of the invention, there is provided an optical glass having a negative anomalous dispersion consisting in weight percent of:

| | |
|---|---|
| $SiO_2$ | 20–50% |
| $B_2O_3$ | 6–20% | where $SiO_2/B_2O_3 \leq 6$ in weight percent,

| | |
|---|---|
| $ZrO_2$ | 0.5–15% |
| $Nb_2O_5$ | 31–50% |
| $Al_2O_3$ | 0–4% |
| $GeO_2$ | 0–5% |
| $Y_2O_3$ | 0–5% |
| $La_2O_3$ | 0–5% |
| $Gd_2O_3$ | 0–5% |
| $Yb_2O_3$ | 0–5% |
| $Ta_2O_5$ | 0–15% |
| $WO_3$ | 0–10% |
| ZnO | 0–14% |
| MgO | 0–7% |
| CaO | 0–7% |
| SrO | 0–14% |
| BaO | 0–14% |
| $Li_2O$ | 0–10% |
| $Na_2O$ | 0–15% |
| $K_2O$ | 0–15% |
| $Sb_2O_3$ | 0–1%. |

In one aspect of the invention, there is provided an optical glass having a negative anomalous dispersion consisting in weight percent of:

| | |
|---|---|
| $SiO_2$ | 20–50% |
| $B_2O_3$ | 6–20% | where $SiO_2/B_2O_3 \leq 6$ in weight percent,

| | |
|---|---|
| $ZrO_2$ | 0.5–15% |
| $Nb_2O_5$ | 31–50% |
| $Al_2O_3$ | 0–4% |
| $GeO_2$ | 0–5% |
| $Y_2O_3$ | 0–5% |
| $La_2O_3$ | 0–5% |
| $Gd_2O_3$ | 0–5% |
| $Yb_2O_3$ | 0–5% |
| $Ta_2O_5$ | 0–15% |
| $WO_3$ | 0–10% |
| ZnO | 0–14% |
| MgO | 0–7% |
| CaO | 0–7% |
| SrO | 0–14% |
| BaO | 0–14% |
| $Li_2O$ | 0–10% |
| $Na_2O$ | 0–15% |
| $K_2O$ | 0–15% |
| $Sb_2O_3$ | 0–1%. | wherein $\Delta\theta$ g, F representing value of anomalous dispersion is −0.001 or below.

In another aspect of the invention, there is provided an optical glass having a negative anomalous dispersion consisting in weight percent of:

| | |
|---|---|
| $SiO_2$ | 20–40% |
| $B_2O_3$ | 6–20% | where $SiO_2/B_2O_3 \leq 6$ in weight percent,

| | |
|---|---|
| $ZrO_2$ | 0.5–15% |
| $Nb_2O_5$ | 31–45% |
| $Al_2O_3$ | 0–4% |
| $GeO_2$ | 0–5% |
| $Y_2O_3 + La_2O_3 + Gd_2O_3 + Yb_2O_3$ | 0–5% | in which

| | |
|---|---|
| $Y_2O_3$ | 0–5% |
| $La_2O_3$ | 0–5% |
| $Gd_2O_3$ | 0–5% |
| $Yb_2O_3$ | 0–5% |
| $Ta_2O_5$ | 0–10% |
| $WO_3$ | 0–10% |
| $ZnO + MgO + CaO + SrO + BaO$ | 0.5–20% | in which

| | |
|---|---|
| ZnO | 0–14% |
| MgO | 0–7% |
| CaO | 0.5–7% |
| SrO | 0–14% |
| BaO | 0–14% |
| $Li_2O + Na_2O + K_2O$ | 0.5–20% | in which

| | |
|---|---|
| $Li_2O$ | 0.5–10% |
| $Na_2O$ | 0–15% |
| $K_2O$ | 0–10% |
| $Sb_2O_3$ | 0–1% | and having refractive index (nd) within a range from 1.65 to 1.80 and Abbe number (v d) within a range from 28 to 42 and also having $\Delta\theta g$, F value representing anomalous dispersion of −0.001 or below.

The value of $\Delta\theta g$, F which represents the anomalous dispersion is calculated in the following manner:

First, relative partial dispersion ($\theta$ g, F) is calculated by the formula $$\theta g, F = \frac{n_g - n_F}{n_F - n_c}$$

Then, in FIG. 1 in which the vertical axis represents the relative partial dispersion ($\theta$ g, F) and the horizontal axis represents the Abbe number (vd), two normal types of glasses NSL7 and PBM2 (both names of glasses made by Kabushiki Kaisha Ohara) having partial dispersion ($\theta$ g, F) and Abbe number (vd) shown in the following Table 1 are selected as reference.

TABLE 1

| Type | $\theta g, F$ | vd |
|---|---|---|
| NSL7 | 0.5436 | 60.49 |
| PBM2 | 0.5828 | 36.26 |

Coordinates ($\theta$ g, F; vd) of these two glasses designated by the black circle mark in FIG. 1 are connected by straight line L. Difference ($\Delta\theta$ g, F) in the vertical axis between this line L and a coordinate ($\theta$ g, F: vd) of a glass to be compared represents a value of deviation in the relative partial dispersion, i.e., anomalous dispersion.

In a case where the value of $\Delta\theta$ g, F thus calculated is of a negative value, i.e., a coordinate ($\theta$ g, F : vd) of a glass is located below the line L in FIG. 1, this glass has a negative anomalous dispersion. In a case where the value of $\Delta\theta$ g, F is of a positive value, i.e., a coordinate ($\theta$ g, F: vd) is above the line L, this glass has positive anomalous dispersion. In both cases of negative and positive values, the larger the absolute value of $\Delta\theta$ g, F, the larger is anomalous dispersion of the glass.

DETAILED DESCRIPTION OF THE INVENTION

Figure 1:
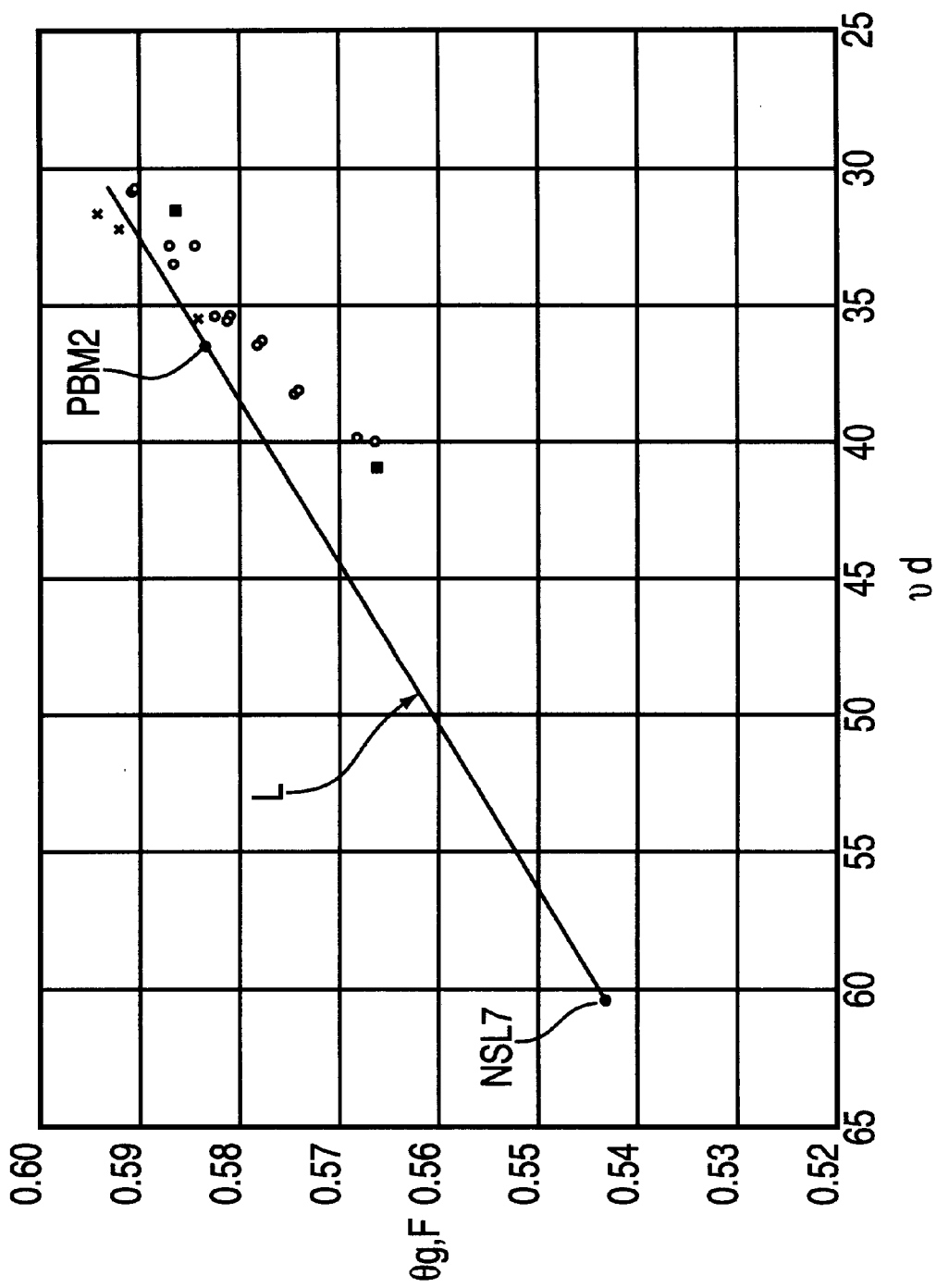
FIG. 1 is a $\theta$ g, F- vd diagram in which the vertical axis represents the relative partial dispersion ($\theta$ g, F) and horizontal axis represents the Abbe number (v d).

In the glass made according to the invention, the above described content ranges of the respective ingredients have been selected for the reasons stated below. In the following description, the content ranges of the respective ingredients are expressed in weight percent.

The $SiO_2$ ingredient is an indispensable ingredient as a glass forming oxide. If the amount of this ingredient is below 20%, a stable glass cannot be obtained and chemical durability of the glass is insufficient. If the amount of this ingredient exceeds 50%, it becomes difficult to obtain a glass having optical constants within the desired ranges and besides the melting property of the glass is deteriorated. For obtaining a glass having an excellent homogeneity, the content range of the $SiO_2$ ingredient should preferably be within a range from 20 to 40%.

The $B_2O_3$ ingredient is an important ingredient as a glass forming oxide like the $SiO_2$ ingredient and is also very important as an ingredient which increases negative anomalous dispersion. If the amount of this ingredient is below 6%, this effect is not sufficiently achieved and the melting property of the glass is deteriorated with resulting difficulty in obtaining a homogeneous glass. If the amount of this ingredient exceeds 20%, the glass becomes instable and its chemical durability is deteriorated. In the present invention, it is most important, for maintaining $\Delta\theta$ g, F representing anomalous dispersion at a value of −0.001 or below, to restrict the weight ratio of $SiO_2/B_2O_3$ to 6 or below.

The $ZrO_2$ ingredient is effective for increasing refractive index and negative anomalous dispersion. If the amount of this ingredient is below 0.5%, a sufficient effect cannot be obtained whereas if the amount of this ingredient exceeds 15%, devitrification occurs and a stable glass cannot be obtained.

The $Nb_2O_5$ ingredient is an indispensable ingredient for maintaining the desired optical constants. If the amount of this ingredient is below 31%, it becomes difficult to maintain the desired optical constants whereas if the amount of this ingredient exceeds 50%, devitrification occurs in the glass. For obtaining a particularly stable glass, the amount of this ingredient should preferably be within a range from 31% to 45%.

The $Al_2O_3$ ingredient may be optionally added for adjusting the optical constants and improving chemical durability. The amount of this ingredient should be up to 4%.

The $GeO_2$ ingredient may be optionally added for adjusting the optical constants. It suffices to add this ingredient in the amount up to 5%.

The $Y_2O_3$, $La_2O_3$, $Gd_2O_3$ and $Yb_2O_3$ ingredients may be optionally added for adjusting the optical constants and improving chemical durability. These ingredients can be added to 5% respectively. These ingredients, however, tend to increase the devitrification tendency of the glass and, for obtaining a stable glass, the total amount of these ingredients should preferably be 5% or below.

The $Ta_2O_5$ and $WO_3$ ingredients may be optionally added for adjusting the optical constants. The amount of the $Ta_2O_5$ ingredient should be up to 15% and preferably up to 10% because this ingredient tends to produce an unmelted portion in a melted glass. The $WO_3$ ingredient tends to decrease the negative anomalous dispersion value and therefore the amount of this ingredient should be up to 10%.

The CaO ingredient is effective for improving chemical durability of the glass and increasing the negative anomalous dispersion value. If the amount of this ingredient exceeds 7%, devitrification tendency occurs in the glass. For achieving the above effects while maintaining stability of the glass, the amount of this ingredient should preferably be within a range from 0.5% to 7%.

The ZnO, MgO, SrO and BaO ingredients may be optionally added for adjusting the optical constants, stabilizing the glass and improving chemical durability. If the amounts of these ingredients exceed 14%, 7%, 14% and 14% respectively, the devitrification tendency increases rather than decreases. For obtaining a glass which is more stable and excellent in chemical durability, the total amount of one or more of the CaO, ZnO, MgO, SrO and BaO ingredients should preferably be within a range from 0.5% to 20%.

The $Li_2O$, $Na_2O$ and $K_2O$ ingredients may be optionally added for enhancing melting of the glass and expanding the glassifying range. If the amounts of these ingredients exceed 10%, 15% and 15% respectively, the devitrification tendency increases rather than decreases. Among these ingredients, the $Li_2O$ ingredient is effective for increasing the negative anomalous dispersion value and therefore this ingredient should preferably be added in the amount of 0.5% or over. Conversely, the $K_2O$ ingredient decreases the negative anomalous dispersion value and therefore the amount of this ingredient should preferably be 10% or below. For maintaining an excellent chemical durability of the glass, the total amount of $Li_2O$, $Na_2O$ and $K_2O$ ingredients should preferably be within a range from 0.5% to 20%.

The $Sb_2O_3$ ingredient may be optionally added as a defoaming agent for refining and homogenizing the glass. The amount up to 1% will suffice for this ingredient.

For improving the melting property and resistivity to devitrification, preventing solarization and for other purposes, ingredients other than the above described ones such as $Rb_2O$, $Cs_2O$, $TiO_2$, $Bi_2O_3$ and F may be optionally added up to the total amount of 1%.

EXAMPLES

Tables 2 to 4 show preferred examples (No. 1 to No. 14) of the optical glass according to the invention having negative anomalous dispersion, comparative examples (No. a to No. c) of the prior art $SiO_2$—$Nb_2O_5$—$R_2O$—RO glass and comparative examples (No d and No. e) of the prior art $SiO_2$—$B_2O_3$—$Al_2O$—PbO glass together with optical constants (nd, vd), relative partial dispersion (θ g, F), anomalous dispersion ( Δθ g, F), acid-proof property (SR value) and weight ratio of $SiO_2/B_2O_3$ of these glasses. In FIG. 1 (θ g, F - vd diagram), coordinates of θ g, F and vd of the glasses of Examples No. 1 to No. 14 are indicated by the circle mark, coordinates of θ g, F and d of the glasses of Comparative Examples No. a to No. c by the x mark and coordinates of θ g, F and vd of the glasses of Comparative Examples No. d and No. e by the black square mark.

The value of Δθ g, F representing anomalous dispersion was calculated by the above described method. The SR value representing anti-acid property shows results of measurement made by employing the measuring method according to ISO 8424: 1987(E). The SR value classifies glasses in accordance with time (h) required for eroding glass specimens by 0.1 micron in a predetermined acid solution. The SR values 1, 2, 3 and 4 indicate that time exceeding 100 h, 100 h–10 h, 10 h–1 h and 1 h–0.1 h respectively are required for the erosion by using a nitric acid solution of pH 0.3. The SR values 5, 51, 52 and 53 indicate that time exceeding 10 h, 10 h–1 h, 1 h–0.1 h and time below 0.1 h are required for the erosion by using an acetic acid buffer solution of pH 4.6. Accordingly, the smaller the SR value, the higher is the acid-proof property of the glass and therefore the more excellent is chemical durability of the glass.

TABLE 2

|  | Examples | | | | | | weight % |
| --- | --- | --- | --- | --- | --- | --- | --- |
| No. | 1 | 2 | 3 | 4 | 5 | 6 | 7 |
| $SiO_2$ | 20.0 | 40.0 | 30.0 | 33.0 | 25.3 | 21.3 | 27.4 |
| $B_2O_3$ | 20.0 | 7.0 | 8.0 | 10.0 | 15.5 | 17.5 | 13.6 |
| $Al_2O_3$ |  |  |  | 4.0 |  |  |  |
| $GeO_2$ |  |  |  |  |  | 4.5 |  |

TABLE 2-continued

| | | | | | | | weight % |
|---|---|---|---|---|---|---|---|
| | Examples | | | | | | |
| No. | 1 | 2 | 3 | 4 | 5 | 6 | 7 |
| $Y_2O_3$ | | | | | | | |
| $La_2O_3$ | | | | | | | 5.0 |
| $Gd_2O_3$ | | | | | | | |
| $Yb_2O_3$ | | | | | | | |
| $ZrO_2$ | 8.0 | 0.5 | 8.0 | 0.5 | 14.5 | 1.9 | 3.6 |
| $Nb_2O_5$ | 31.9 | 38.0 | 32.0 | 41.5 | 32.0 | 33.0 | 32.5 |
| $Ta_2O_5$ | | | | | | | |
| $WO_3$ | | | | | | | |
| ZnO | | | | | | 10.9 | |
| PbO | | | | | | | |
| MgO | | | | | | | 5.0 |
| CaO | 0.5 | 0.5 | 4.0 | 1.0 | 0.5 | 7.0 | 1.4 |
| SrO | | | | | | | |
| BaO | 13.0 | 1.0 | 2.0 | | | | |
| $Li_2O$ | 0.5 | 9.5 | 5.0 | 10.0 | 0.5 | 1.5 | 0.5 |
| $Na_2O$ | 5.0 | | 7.0 | | 7.1 | | 10.9 |
| $K_2O$ | 1.0 | 3.5 | 3.0 | | | 6.9 | |
| $Sb_2O_3$ | 0.1 | | 1.0 | | 0.1 | | 0.1 |
| $As_2O_3$ | | | | | | | |
| $SiO_2/B_2O_3$ | 1.0 | 5.7 | 3.8 | 3.3 | 1.6 | 1.2 | 2.0 |
| nd | 1.70892 | 1.71503 | 1.65923 | 1.72142 | 1.72656 | 1.69072 | 1.66778 |
| vd | 35.2 | 35.2 | 39.9 | 32.6 | 32.6 | 36.2 | 38.1 |
| θg, F | 0.5807 | 0.5822 | 0.5662 | 0.5867 | 0.5842 | 0.5775 | 0.5741 |
| Δθg, F | −0.0038 | −0.0023 | −0.0107 | −0.0020 | −0.0045 | −0.0054 | −0.0057 |
| SR | 1 | 1 | 1 | 1 | 1 | 1 | 1 |

TABLE 3

| | | | | | | | weight % |
|---|---|---|---|---|---|---|---|
| | Examples | | | | | | |
| No. | 8 | 9 | 10 | 11 | 12 | 13 | 14 |
| $SiO_2$ | 37.6 | 32.0 | 32.0 | 32.0 | 25.0 | 23.0 | 20.0 |
| $B_2O_3$ | 6.5 | 11.5 | 6.0 | 8.0 | 12.0 | 4.0 | 17.5 |
| $Al_2O_3$ | | | | | | | |
| $GeO_2$ | | | | | | | |
| $Y_2O_3$ | | | | 5.0 | | 2.0 | |
| $La_2O_3$ | | | | | | 1.0 | |
| $Gd_2O_3$ | 4.0 | | | | | 2.0 | |
| $Yb_2O_3$ | | | | 5.0 | | | |
| $ZrO_2$ | 1.0 | 2.4 | 1.3 | 7.4 | 2.5 | 12.0 | 5.0 |
| $Nb_2O_5$ | 36.2 | 31.1 | 45.0 | 32.1 | 34.9 | 31.0 | 31.4 |
| $Ta_2O_5$ | | 9.0 | | | | 1.0 | |
| $WO_3$ | | | | | 9.8 | | |
| ZnO | 0.9 | | | | | | 2.0 |
| PbO | | | | | | | |
| MgO | | 6.5 | | | | | 7.0 |
| CaO | 3.0 | 1.0 | 1.0 | 0.7 | 0.5 | 2.0 | 3.5 |
| SrO | | | 14.0 | | | | 7.0 |
| BaO | | | | | | | |
| $Li_2O$ | 0.7 | 6.4 | 0.5 | 1.1 | 0.7 | 6.0 | 0.5 |
| $Na_2O$ | | | | | 14.5 | 12.0 | 6.0 |
| $K_2O$ | 10.0 | | | 8.7 | | 4.0 | |
| $Sb_2O_3$ | 0.1 | 0.1 | 0.2 | | 0.1 | | 0.1 |
| $As_2O_3$ | | | | | | | |
| $SiO_2/B_2O_3$ | 5.8 | 2.8 | 5.3 | 4.0 | 2.1 | 5.8 | 1.1 |
| nd | 1.72031 | 1.71151 | 1.77964 | 1.70233 | 1.77327 | 1.67305 | 1.65911 |
| vd | 33.3 | 36.4 | 30.6 | 35.4 | 30.5 | 37.9 | 39.8 |
| θg, F | 0.5863 | 0.5782 | 0.5903 | 0.5811 | 0.5901 | 0.5736 | 0.5680 |
| Δθg, F | −0.0013 | −0.0044 | −0.0017 | −0.0031 | −0.0020 | −0.0065 | −0.0091 |
| SR | 1 | 1 | 1 | 1 | 1 | 1 | 1 |

TABLE 4 weight %

| No. | Comparative Examples | | | | |
|---|---|---|---|---|---|
| | a | b | c | d | e |
| $SiO_2$ | 26.0 | 20.0 | 28.0 | 13.7 | 16.9 |
| $B_2O_3$ | 4.0 | | 2.0 | 29.7 | 12.9 |
| $Al_2O_3$ | | | | 12.7 | 8.8 |
| $GeO_2$ | | | | | |
| $Y_2O_3$ | | | | | |
| $La_2O_3$ | | | 5.0 | 2.6 | 1.8 |
| $Gd_2O_3$ | | | | | |
| $Yb_2O_3$ | | | | | |
| $ZrO_2$ | 5.0 | | | | |
| $Nb_2O_5$ | 25.0 | 40.0 | 27.0 | | |
| $Ta_2O_6$ | | 10.0 | | | |
| $WO_3$ | | | | | |
| ZnO | | | | | |
| PbO | | | | 41.0 | 59.4 |
| MgO | | | | | |
| CaO | 20.0 | 5.0 | | | |
| SrO | | | | | |
| BaO | | | 30.0 | | |
| $Li_2O$ | 2.0 | 5.0 | 3.0 | | |
| $Na_2O$ | | 15.0 | | | |
| $K_2O$ | 18.0 | 5.0 | 5.0 | | |
| $Sb_2O_3$ | | | | | |
| $As_2O_3$ | | | | 0.3 | 0.2 |
| $SiO_2/B_2O_3$ | 6.5 | | 14.0 | 0.5 | 1.3 |
| nd | 1.6786 | 1.6985 | 1.6955 | 1.6389 | 1.7377 |
| vd | 32.0 | 31.3 | 35.3 | 40.8 | 31.4 |
| θg,F | 0.5920 | 0.5940 | 0.5840 | 0.5660 | 0.5860 |
| Δθg,F | +0.0023 | +0.0032 | −0.0004 | −0.0095 | −0.0047 |
| SR | 1 | 1 | 1 | 51 | 53 |

As shown in Tables 2, 3 and 4 and FIG. 1, the glasses of Examples No. 1 to No. 14 have negative anomalous dispersion Δθ g, F the absolute value of which is larger than that of the glasses of Comparative Examples No. a to No. c and therefore have a larger negative anomalous dispersion. The glasses of Comparative Examples No. d and No. e have a negative anomalous dispersion value which is about as large as those of the examples of the invention. However, as shown in Tables 2 to 4, the glasses of Examples No. 1 to No. 14 all have SR value of 1 and therefore are superior in the acid-proof property and chemical durability to the glasses of Comparative Examples No. d and No. e.

For manufacturing the glasses of Examples No. 1 to No. 14, normal raw materials for the optical glass including oxides, carbonates and nitrates are weighed and mixed and the mixture is melted in a platinum crucible at a temperature of 1300° C. to 1400° C. for about 3 to 4 hours depending upon the melting property of the raw materials. The melted glass is defoamed, stirred and homogenized and then the temperature is lowered to a proper temperature. The glass is formed to a glass product by casting in a metal mold and subsequent annealing.

As described in the foregoing, the optical glass having a negative anomalous dispersion of the invention is a $SiO_2$—$B_2O_3$—$ZrO_2$—$Nb_2O_5$ glass of a specific composition, having optical constants of predetermined ranges and a large negative anomalous dispersion value. The optical glass of the invention contains no PbO or $As_2O_3$ which is costly for protecting the environment. The optical glass of the invention besides has excellent chemical durability and homogeneity. Moreover, since the optical glass of the invention has a low glass transformation temperature, it is suitable for mold pressing, i.e., precision pressing of glass according to which pressed glass can be used directly as an optical element such as an optical lens without requiring grinding or polishing after press forming.

What is claimed is:

1. An optical glass having a negative anomalous dispersion consisting in weight percent of:

| | |
|---|---|
| $SiO_2$ | 20–50% |
| $B_2O_3$ | 6–20% |
| where $SiO_2/B_2O_3 \leq 6$ in weight percent, | |
| $ZrO_2$ | 0.5–15% |
| $Nb_2O_5$ | 31–50% |
| $Al_2O_3$ | 0–4% |
| $GeO_2$ | 0–5% |
| $Y_2O_3$ | 0–5% |
| $La_2O_3$ | 0–5% |
| $Gd_2O_3$ | 0–5% |
| $Yb_2O_3$ | 0–5% |
| $Ta_2O_5$ | 0–15% |
| $WO_3$ | 0–10% |
| ZnO | 0–14% |
| MgO | 0–7% |
| CaO | 0.5–4% |
| SrO | 0–14% |
| BaO | 0–14% |
| $Li_2O$ | 0.5–10% |
| $Na_2O$ | 0–15% |
| $K_2O$ | 0–8.7% |
| $Sb_2O_3$ | 0–1% | where $SiO_2/B_2O_3 \leq 6$ in weight percent,

| | |
|---|---|
| $ZrO_2$ | 0.5–15% |
| $Nb_2O_5$ | 31–50% |
| $Al_2O_3$ | 0–4% |
| $GeO_2$ | 0–5% |
| $Y_2O_3$ | 0–5% |
| $La_2O_3$ | 0–5% |
| $Gd_2O_3$ | 0–5% |
| $Yb_2O_3$ | 0–5% |
| $Ta_2O_5$ | 0–15% |
| $WO_3$ | 0–10% |
| ZnO | 0–14% |
| MgO | 0–7% |
| CaO | 0.5–4% |
| SrO | 0–14% |
| BaO | 0–14% |
| $Li_2O$ | 0.5–10% |
| $Na_2O$ | 0–15% |
| $K_2O$ | 0–8.7% |
| $Sb_2O_3$ | 0–1% | and having a refractive index (nd) within a range from 1.65 to 1.78 and an Abbe number (v d) within a range form 28 to 38.1 and also having an anomalous dispersion (Δθ g, F) of −0.001 or below.

2. An optical glass having a negative anomalous dispersion consisting in weight percent of:

| | |
|---|---|
| $SiO_2$ | 20–40% |
| $B_2O_3$ | 6–20% | where $SiO_2/B_2O_3 \leq 6$ in weight percent,

| | |
|---|---|
| $ZrO_2$ | 0.5–15% |
| $Nb_2O_5$ | 31–45% |
| $Al_2O_3$ | 0–4% |
| $GeO_2$ | 0–5% |
| $Y_2O_3 + La_2O_3 + Gd_2O_3 + Yb_2O_3$ | 0–5% | in which

| | |
|---|---|
| $Y_2O_3$ | 0–5% |
| $La_2O_3$ | 0–5% |
| $Gd_2O_3$ | 0–5% |
| $Yb_2O_3$ | 0–5% |
| $Ta_2O_5$ | 0–10% |
| $WO_3$ | 0–10% |
| $ZnO + MgO + CaO + SrO + BaO$ | 0.5–20% | in which

| | |
|---|---|
| ZnO | 0–14% |
| MgO | 0–7% |
| CaO | 0.5–[7]4% |
| SrO | 0–14% |
| BaO | 0–14% |
| $Li_2O + Na_2O + K_2O$ | 0.5–20% | in which

| | |
|---|---|
| $Li_2O$ | 0.5–10% |
| $Na_2O$ | 0–15% |
| $K_2O$ | 0–[10]8.7% |
| $Sb_2O_3$ | 0–1% | and having a refractive index (nd) within a range from 1.65 to 1.78 and an Abbe number (ν d) within a range from 28 to 38.1 and also having an anomalous dispersion Δθg, F of −0.001 or below.

* * * * *